United States Patent
Matsuike et al.

(10) Patent No.: US 8,780,723 B2
(45) Date of Patent: Jul. 15, 2014

(54) COMMUNICATION SYSTEM AND COMMUNICATION APPARATUS

(75) Inventors: Mitsumasa Matsuike, Kawasaki (JP); Nobuhiro Rikitake, Machida (JP); Kazuhiro Ohnuma, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 237 days.

(21) Appl. No.: 13/483,591

(22) Filed: May 30, 2012

(65) Prior Publication Data

US 2012/0314579 A1 Dec. 13, 2012

(30) Foreign Application Priority Data

Jun. 7, 2011 (JP) ................. 2011-127202

(51) Int. Cl.
*H04L 12/56* (2006.01)

(52) U.S. Cl.
USPC .......................................... 370/236

(58) Field of Classification Search
CPC .............. H04L 12/2472; H04L 12/569; H04L 65/4092; H04L 47/29; H04L 65/80
USPC ........................................ 370/236
See application file for complete search history.

(56) References Cited

U.S. PATENT DOCUMENTS

| 7,363,371 | B2* | 4/2008 | Kirkby et al. | 709/225 |
| 8,599,684 | B1* | 12/2013 | Goertz et al. | 370/229 |
| 2009/0103438 | A1* | 4/2009 | Groh et al. | 370/235 |

FOREIGN PATENT DOCUMENTS

| JP | 8-316976 | 11/1996 |
| JP | 2003-69627 | 3/2003 |

* cited by examiner

*Primary Examiner* — Jianye Wu
(74) *Attorney, Agent, or Firm* — Staas & Halsey LLP

(57) ABSTRACT

A communication system includes a first communication apparatus including one or more first processors that determine a first bandwidth variance for each flow, based on a requested bandwidth variance amount and a surplus bandwidth of a physical line, and a first transmitter that transmits the first bandwidth variance to an adjacent apparatus; and a second communication apparatus including one or more second processors that set the received first bandwidth variance as a requested bandwidth variance amount for the second communication apparatus and determine a second bandwidth variance for each flow from the first bandwidth variance and the surplus bandwidth, and a second transmitter that transmits the second bandwidth variance to an adjacent apparatus.

10 Claims, 17 Drawing Sheets

| 8B | 6B | 6B | 2B | 2B | 1B | 43 ··· 1497B | 4B |
|---|---|---|---|---|---|---|---|
| PREAMBLE/SFD | DESTINATION ADDRESS | SENDER ADDRESS | TYPE | VLAN TAG | ALGORITHM | DATA | FCS |

F3

| PORT | VLAN-ID | Δ Bk |
|---|---|---|
| PORT B | VLAN1 | 41.66667 |
| PORT B | VLAN2 | 83.33333 |
| PORT B | VLAN3 | 125 |
| PORT B | Burst | 0 |
| PORT C | VLAN1 | 41.66667 |
| PORT C | VLAN3 | 125 |
| PORT C | VLAN4 | 0 |
| PORT C | Burst | 0 |
| PORT D | VLAN2 | 83.33333 |
| PORT D | VLAN3 | 125 |
| PORT D | VLAN4 | 0 |
| PORT D | Burst | 0 |

| PORT | VLAN-ID | INITIAL BANDWIDTH | BANDWIDTH INCREASE/ DECREASE |
|---|---|---|---|
| PORT B | VLAN1 | 100 | 41.66667 |
| PORT B | VLAN2 | 200 | 83.33333 |
| PORT B | VLAN3 | 400 | 125 |
| PORT B | Burst | 50 | 0 |
| PORT B | SURPLUS BANDWIDTH | 250 | |
| PORT C | VLAN1 | | |
| PORT C | VLAN3 | | |
| PORT C | VLAN4 | | |
| PORT C | Burst | | |
| PORT C | SURPLUS BANDWIDTH | | |
| PORT D | VLAN2 | | |
| PORT D | VLAN3 | | |
| PORT D | VLAN4 | | |
| PORT D | Burst | | |
| PORT D | SURPLUS BANDWIDTH | | |

FIG. 7

| VLAN-ID | INITIAL BANDWIDTH | BANDWIDTH INCREASE/ DECREASE |
|---|---|---|
| VLAN1 | 100 | 0 |
| VLAN2 | 200 | 0 |
| VLAN3 | 400 | 0 |
| VLAN4 | | |
| VLAN5 | | |
| VLAN6 | | |
| VLAN7 | | |
| VLAN8 | | |
| VLAN9 | | |
| VLAN10 | | |
| Burst | 50 | 0 |
| SURPLUS BANDWIDTH | 250 | 0 |

DB3

| VLAN-ID | T1 | T2 | ... | Tn |
|---|---|---|---|---|
| VLAN1 | 100 | 141 | | |
| VLAN2 | 200 | 283 | | |
| VLAN3 | 400 | 525 | | |
| VLAN4 | 100 | | | |
| VLAN5 | | | | |
| VLAN6 | | | | |
| VLAN7 | | | | |
| VLAN8 | | | | |
| VLAN9 | | | | |
| VLAN10 | | | | |

FIG. 9

| 8B | 6B | 6B | 2B | 2B | 6B | 38...1492B | 4B |
|---|---|---|---|---|---|---|---|
| PREAMBLE/SFD | DESTINATION ADDRESS | SENDER ADDRESS | TYPE | VLAN TAG | BANDWIDTH SET VALUE | DATA | FCS |

| 8B | 6B | 6B | 2B | 4B | 3B | 2B | 2B | 6B | 31...1485B | 4B |
|---|---|---|---|---|---|---|---|---|---|---|
| PREAMBLE/SFD | DESTINATION ADDRESS | SENDER ADDRESS | TYPE | TIME | DURATION | TYPE | VLAN TAG | BANDWIDTH SET VALUE | DATA | FCS |

| 8B | 6B | 6B | 2B | 2B | 1B | 43...1497B | 4B |
|---|---|---|---|---|---|---|---|
| PREAMBLE/SFD | DESTINATION ADDRESS | SENDER ADDRESS | TYPE | VLAN TAG | ALGORITHM | DATA | FCS |

| ALGORITHM | FIELD VALUE (DECIMAL) | PURPOSE OF USE |
|---|---|---|
| RR | 1 | INITIAL OPERATION |
| DRR | 2 | AUTONOMOUS BANDWIDTH ADJUSTMENT |
| SP | 4 | OCCURRENCE OF FAILURE OR EMERGENCY |

COMMUNICATION SYSTEM AND COMMUNICATION APPARATUS

CROSS-REFERENCE TO RELATED APPLICATION

This application is based upon and claims the benefit of priority of the prior Japanese Patent Application No. 2011-127202, filed on Jun. 7, 2011, the entire contents of which are incorporated herein by reference.

FIELD

The embodiments discussed herein are related to a communication system and a communication apparatus.

BACKGROUND

A data center is a facility that provides connection lines for the Internet and maintenance and operating services, and the demand for such data centers is increasing in accordance with the widespread use of the Internet.

In a data center, servers, storage units, Layer 2 switches (L2 switches), etc. are housed in a number of racks, and L2 switches serve to transmit all the traffic together from servers or storage units to a host.

Meanwhile, in accordance with the development of cloud computing, the number of virtual machines (VMs) within a physical server is increasing, and accordingly, communication control is becoming more complicated in a network within a data center. Under these circumstances, it is desirable to construct a data center that secures data traffic and implements high-quality communication even though the number of VMs is increasing.

As known bandwidth setting techniques, a technique for allocating a surplus bandwidth in accordance with the proportion of requested bandwidths has been proposed in, for example, Japanese Laid-open Patent Publication No. 2003-069627.

In an operation management system within a data center, bandwidth setting control for allocating bandwidths to VMs is performed. As the number of VMs increases, bandwidth setting for allocating a bandwidth to each VM becomes more complicated, thereby increasing a load imposed on the operation management system.

An increase in the load increases delay time, which makes it difficult to speedily perform bandwidth setting, thereby decreasing the communication quality in a network within a data center.

SUMMARY

According to an aspect of the invention, a communication system includes a first communication apparatus including one or more first processors that determine a first bandwidth variance for each flow, based on a requested bandwidth variance amount and a surplus bandwidth of a physical line, and a first transmitter that transmits the first bandwidth variance to an adjacent apparatus; and a second communication apparatus including one or more second processors that set the received first bandwidth variance as a requested bandwidth variance amount for the second communication apparatus and determine a second bandwidth variance for each flow from the first bandwidth variance and the surplus bandwidth, and a second transmitter that transmits the second bandwidth variance to an adjacent apparatus.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 illustrates an example of the storage state of a port-unit bandwidth variance database.

FIG. 7 illustrates an example of the storage state of an apparatus set value database.

FIG. 9 illustrates a format of a control frame.

FIG. 10 illustrates a format of a control frame.

FIG. 11 illustrates a format of a control frame.

FIG. 12 illustrates an example of setting of an algorithm field.

DESCRIPTION OF EMBODIMENTS

Figure 1:
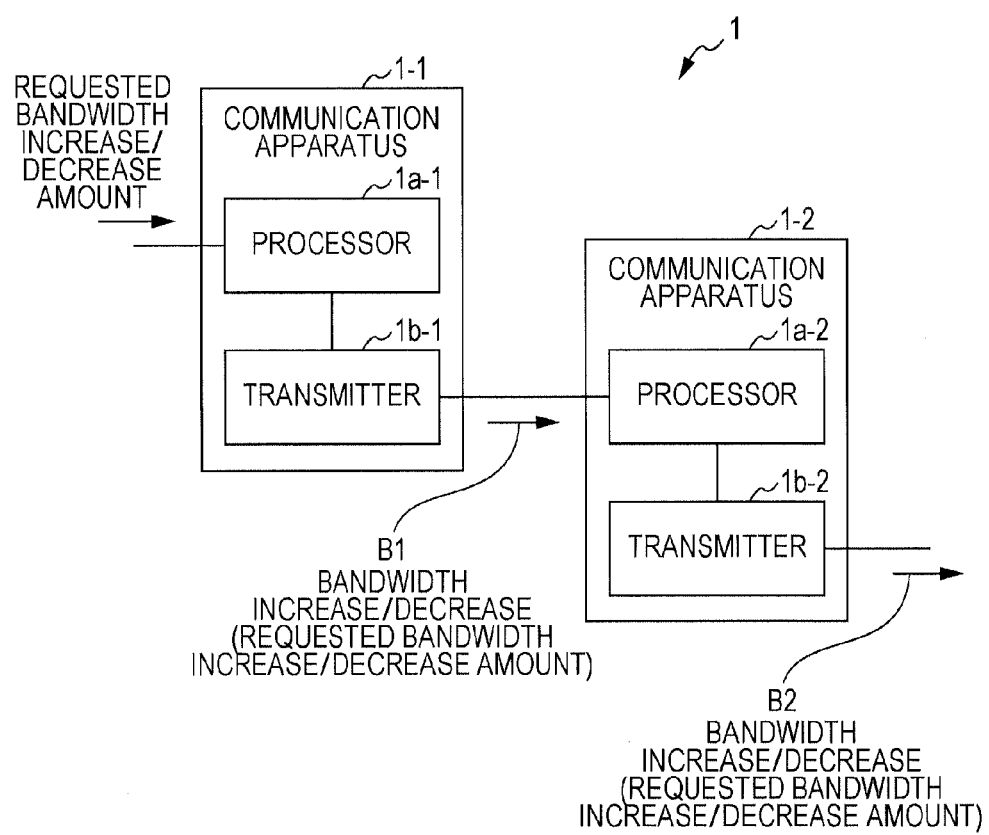
FIG. 1 illustrates an example of the configuration of a communication system.

Embodiments will be described below with reference to the accompanying drawings. FIG. 1 illustrates an example of the configuration of a communication system 1. The communication system 1 includes a communication apparatus 1-1 (first communication apparatus) and a communication apparatus 1-2 (second communication apparatus). In FIG. 1, although two communication apparatuses are illustrated, three or more communication apparatuses may be used to form a mesh or ring network.

The communication apparatus 1-1 includes a processor 1*a*-1 (one or more first processors) that executes an autonomous bandwidth control program and a transmitter 1*b*-1 (first transmitter). The communication apparatus 1-2 includes a processor 1*a*-2 (one or more second processors) that executes an autonomous bandwidth control program and a transmitter 1*b*-2 (second transmitter).

In the communication apparatus 1-1, the processor 1*a*-1 executes the autonomous bandwidth control program to autonomously determine, for each flow, a bandwidth increase/decrease (first bandwidth variance) B1 to be set for the communication apparatus 1-1 from a requested bandwidth increase/decrease (variance) amount and a surplus bandwidth of a physical line. The transmitter 1b-1 transmits the bandwidth increase/decrease B1 to an adjacent apparatus.

In the communication apparatus 1-2, the processor 1a-2 receives the bandwidth increase/decrease B1 and sets the received bandwidth increase/decrease B1 as a requested bandwidth increase/decrease (variance) amount for the communication apparatus 1-2. Then, the processor 1a-2 autonomously determines, for each flow, a bandwidth increase/decrease (second bandwidth variance) B2 to be set for the communication apparatus 1-2 from the bandwidth increase/decrease B1 and the surplus bandwidth. The transmitter 1b-2 transmits the bandwidth increase/decrease B2 to an adjacent apparatus.

In this manner, in the communication system 1, the communication apparatus 1-1 autonomously determines the bandwidth increase/decrease B1 in accordance with the requested bandwidth increase/decrease amount, and then, transmits the bandwidth increase/decrease B1 to an adjacent apparatus. Upon receiving the bandwidth increase/decrease B1, the communication apparatus 1-2 regards the bandwidth increase/decrease B1 as the requested bandwidth increase/decrease amount for the communication apparatus 1-2, and autonomously determines the bandwidth increase/decrease B2, as in the communication apparatus 1-1.

With this configuration, instead of an operation management system performing bandwidth setting for a plurality of communication apparatuses, each of the plurality of communication apparatuses autonomously performs bandwidth setting. It is thus possible to decrease a load for bandwidth setting in the operation management system, thereby improving the communication quality.

Figure 2:
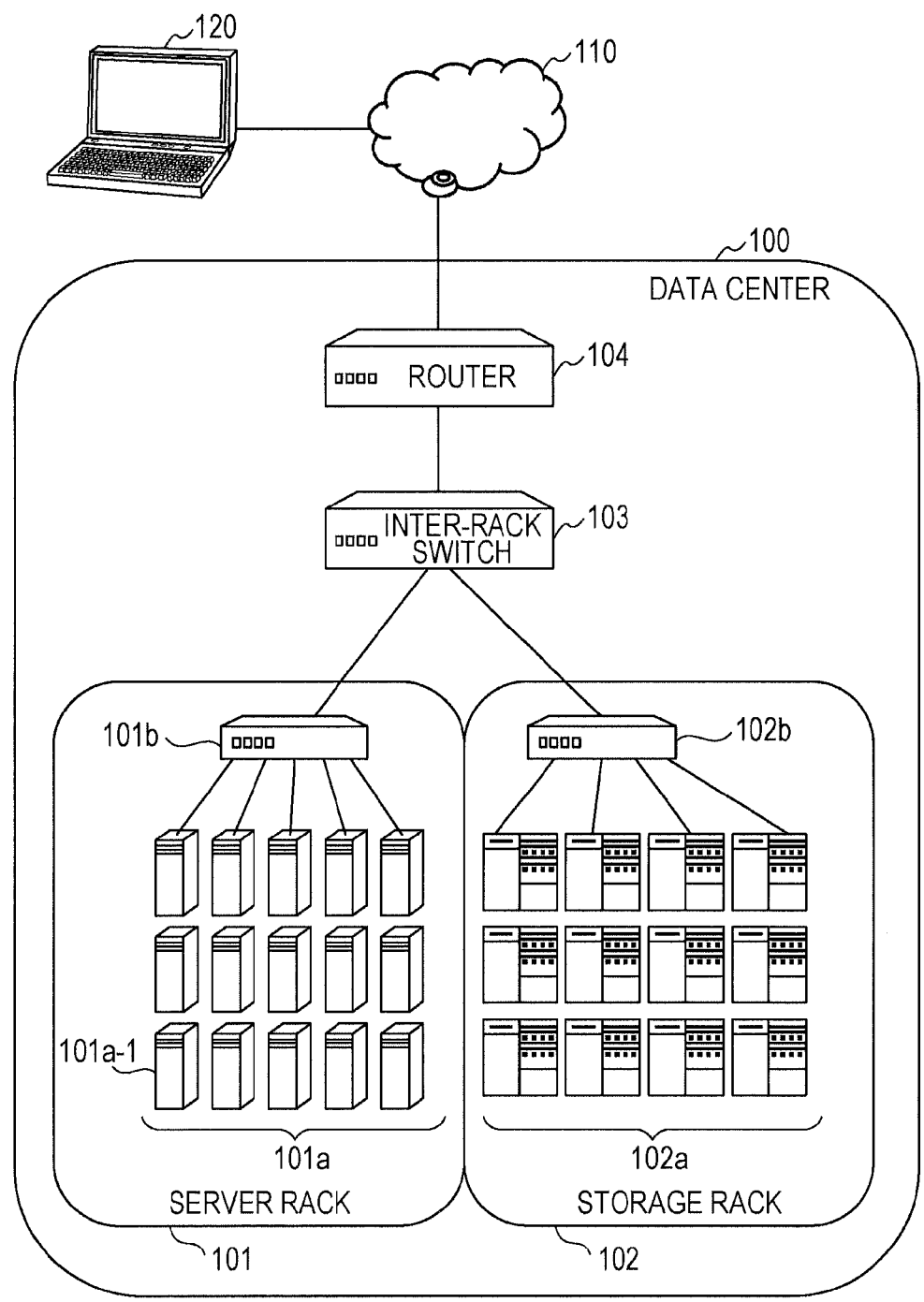
FIG. 2 illustrates an example of the configuration of a data center.

An example of the configuration of a data center 100 will now be described with reference to FIG. 2. The data center 100 includes a server rack 101, a storage rack 102, an inter-rack switch 103, and a router 104.

In the server rack 101, a server set 101a including a plurality of servers and a top-of-rack switch 101b are housed, and each of the servers of the server set 101a is connected to the top-of-rack switch 101b.

In the storage rack 102, a storage set 102a including a plurality of storage units and a top-of-rack switch 102b are housed, and each of the storage units of the storage set 102a is connected to the top-of-rack switch 102b.

The inter-rack switch 103 connects each of the top-of-rack switches 101b and 102b with the router 104. The router 104 has a security function, such as a firewall, in addition to a routing function.

The router 104 disposed within the data center 100 is connected to the Internet 110, and an end user terminal 120 is connected to the Internet 110.

The top-of-rack switches 101b and 102b are L2 switches, which serve to transmit all the traffic together from the servers and the storage units, respectively, to a host. The L2 switches also reserve a communication bandwidth by using Quality of Service (QoS) and thereby secure traffic for each of various flows. For example, the various flows include at least one of a network in units of users, virtual local area networks (VLANs), services, or the like.

Each of the servers of the server set 101a is provided with a VM, and at least one server (server 101a-1) which serves as an operation management system is disposed.

The server 101a-1 hitherto performs bandwidth setting control for allocating bandwidths to a plurality of VMs. As the number of VMs increases, bandwidth setting for allocating bandwidths to an increased number of VMs becomes more complicated, thereby increasing a load.

If bandwidth setting is centrally performed in this manner, as the number of VMs increases, a load increases and delay time also increases, thereby decreasing the performance. As a result, the communication quality of the L2 network within the data center 100 is decreased.

In view of this background, the present technology provides a communication system and a communication apparatus that improve the communication quality by reducing a load for bandwidth setting in an operation management system.

Details of autonomous bandwidth control will be given by taking an example in which the communication apparatuses 1-1 and 1-2 illustrated in FIG. 1 are applied to switches (L2 switches) within an L2 network.

Figure 3:
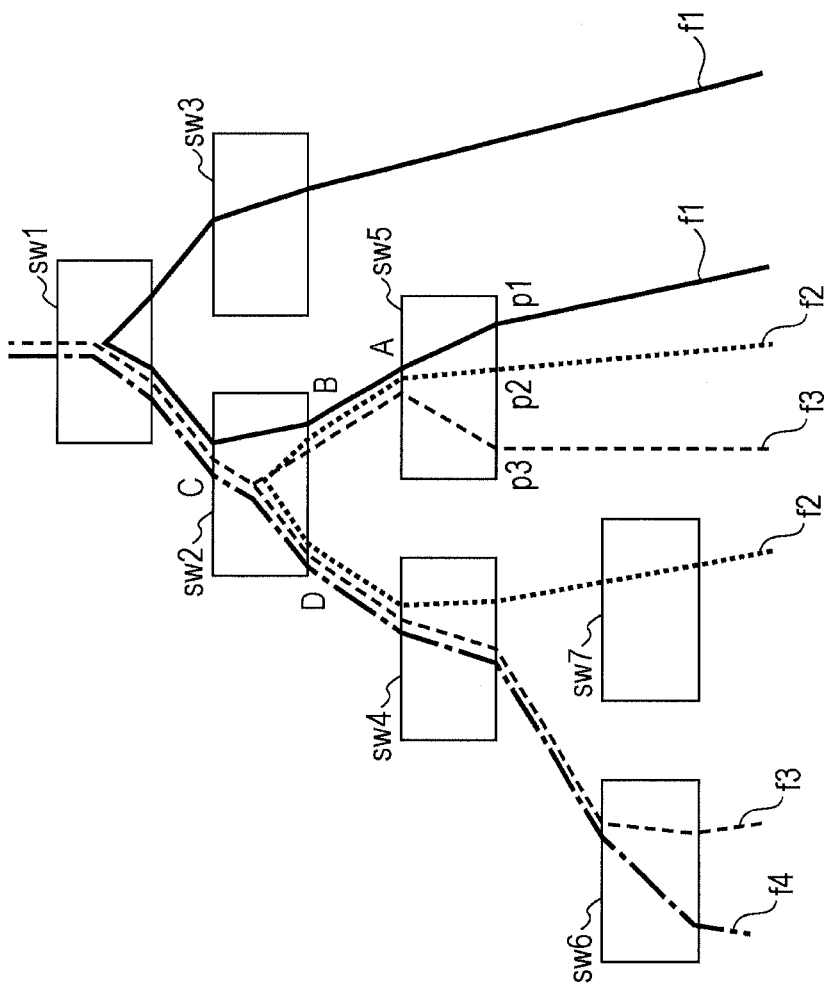
FIG. 3 illustrates an example in which flows are set.

FIG. 3 illustrates an example in which flows are set. Switches sw1 through sw7 are disposed within the L2 network.

The configuration in which the switches sw1 through sw7 are connected to one another by using physical lines is as follows. The switch sw1 is connected to the switches sw2 and sw3. The switch sw2 is connected to the switches sw1, sw4, and sw5. The switch sw3 is connected to the switch sw1.

The switch sw4 is connected to the switches sw2, sw6, and sw7. The switch sw5 is connected to the switch sw2. The switch sw6 is connected to the switch sw4. The switch sw7 is connected to the switch 4.

Flows for the switches sw1 through sw7 are as follows. A flow f1 passes through the switches sw1, sw2, sw3, and sw5. A flow f2 passes through the switches sw2, sw4, sw5, and sw7. A flow f3 passes through the switches sw1, sw2, sw4, sw5, and sw6. A flow f4 passes through the switches sw1, sw2, sw4, and sw6.

At the distal ends of the flows f1 through f4, devices that terminate the layer 2 communication, such as servers, routers, L3 switches, etc., are disposed.

Preconditions

A description will first be given of preconditions to be considered when performing autonomic bandwidth control. It is assumed that the flows are each identified by VLAN-ID (Identifier) in accordance with the user or the purpose of use and that the user sets the peak information rate (PIR) for each flow.

The switch sw2 has ports B, C, and D, and the switch sw5 has ports p1, p2 and p3 and a port A. In the switch sw5, the flows f1, f2, and f3 are set to pass through the ports p1, p2, and p3, respectively, and the flows f1, f2, and f3 are integrally set to pass through the port A.

In the switch sw2, the flows f1, f2, and f3 are set to pass through the port B since the port B is connected to the port A of the switch sw5. The flows f1, f3, and f4 are set to pass through the port C, and the flows f2, f3, and f4 are set to pass through the port D.

If N flows are set in the entire network, bandwidths to be set for the flows are represented by B1, B2, . . . , Bk, . . . , Bn. The requested bandwidth increase/decrease amounts are represented by $\Delta B1, \Delta B2, \ldots, \Delta Bk, \ldots, \Delta Bn$.

The bandwidth reserved for burst traffic (hereinafter simply referred to as the "burst traffic bandwidth") is indicated by Bb, and the surplus bandwidth of a physical line is indicated by Br. "Burst traffic" refers to traffic when a consumed bandwidth exceeds a set bandwidth.

When backing up a system, large files are transferred, and thus, a large bandwidth is temporarily consumed, thereby increasing the likelihood of the occurrence of burst traffic.

Generally, in order to deal with such burst traffic, a buffer capacity for storing burst traffic is secured.

Generation of Bandwidth Increase/Decrease Request in Switch sw5

It is now assumed that a bandwidth increase/decrease (variance) request has been generated at the ports p1, p2, and p3 of the switch sw5. If the bandwidth increase/decrease request concerns a request to decrease a bandwidth, the amount of a bandwidth equal to the decrease is added to the surplus bandwidth Br.

On the other hand, if the bandwidth increase/decrease request concerns a request to increase the bandwidth, the bandwidth used at the port A is examined. In the switch sw5, if the total of the bandwidth increases for the flows f1, f2, and f3 exceeds the physical bandwidth of the port A, the switch sw5 autonomously adjusts the bandwidth in the port A.

This will be discussed by taking a specific example (hereinafter "M" represents the units of Mbps). It is assumed that the bandwidths B1, B2, and B3 set for the flows 1, 2, and 3, respectively, which have not yet been increased are B1=100 M, B2=200 M, and B3=400 M, respectively.

The burst traffic Bb and the surplus bandwidth Br are Bb=50 M and Br=250 M, respectively.

It is now assumed that, as bandwidth increase/decrease (variance) requests, the requested bandwidth increase amounts $\Delta B1$, $\Delta B2$, and $\Delta B3$ for the flows f1, f2, and f3, respectively, are $\Delta B1$=100 M, $\Delta B2$=200 M, and $\Delta B3$=300 M, respectively.

The total of the requested bandwidth increase amounts for the flows f1, f2, and f3 is 600 M (=100 M+200 M+300 M), and the difference between the total of the requested bandwidth increase amounts and the surplus bandwidth Br=250 M results in a shortage of 350 M. Accordingly, it is not possible to accept such bandwidth increase requests, and thus, bandwidth adjustment is performed.

If the above-described adjustment-operation decision approach is generalized, it may be represented as follows. If a decision index, which is used for a bandwidth increase request, for deciding whether to adjust a currently set bandwidth is indicated by D, the decision index D is expressed by the following equation (1).

$$D=Br-(\Sigma \Delta Bi) \quad (1)$$

That is, the decision index D is a value obtained by subtracting a total of requested bandwidth increase amounts for individual flows from a surplus bandwidth. If D≥0, it is possible to accept the requested bandwidth increase amounts, and thus, the requested bandwidth increase amounts are added to the current bandwidths.

In contrast, if D<0, the total of the requested bandwidth increase amounts exceeds the surplus bandwidth, excess bandwidth is distributed in accordance with the proportion of the requested bandwidth increases, thereby adjusting the bandwidths.

If the requested bandwidth increase/decrease amount $\Delta Bk$ for the flow fk after bandwidth adjustment has been made is indicated by $\Delta Bka$, the adjusted bandwidth $\Delta Bka$ is expressed by the following equation (2).

$$\Delta Bka = \Delta Bk + D \times (\Delta Bk/\Sigma \Delta Bi) \quad (2)$$

The adjusted bandwidth increase/decrease amounts for the flows f1, f2, and f3 in the above-described example are calculated by using equation (2). Concerning the adjusted bandwidth increase/decrease $\Delta B1a$ for the flow f1, $\Delta B1a$=41.6 M [=$\Delta B1+D \times (\Delta B1/\Delta B1+\Delta B2+\Delta B3)$=(100 M+(−350)×(100 M/(100 M+200 M+300 M))].

Concerning the adjusted bandwidth increase/decrease $\Delta B2a$ for the flow f2, $\Delta B2a$=83.3 M [=$\Delta B2+D \times (\Delta B2/\Delta B1+\Delta B2+\Delta B3)$=(200 M+(−350)×(200 M/(100 M+200 M+300 M))].

Concerning the adjusted bandwidth increase/decrease $\Delta B3a$ for the flow f3, $\Delta B3a$=125 M [=$\Delta B3+D \times (\Delta B3/\Delta B1+\Delta B2+\Delta B3)$=(300 M+(−350)×(300 M/(100 M+200 M+300 M))].

By summarizing the above-described result, at the port A of the switch sw5, the adjusted bandwidth increase/decrease for the flow f1 is 41.6 M, the adjusted bandwidth increase/decrease for the flow f2 is 83.3 M, and the adjusted bandwidth increase/decrease for the flow f3 is 125 M.

Generally, as the final bandwidth increase/decrease for a flow that passes through a switch, the smallest value among the bandwidth increase/decrease amounts at the ports of the switch is used.

For example, it is now assumed that the flow f1 passes through the ports p1 through pm of a certain switch, and that the bandwidth increase/decrease amounts at the ports p1, p2, and pm are $\Delta B1a$ (p1), $\Delta B1a$ (p2), and $\Delta B1a$ (pm), respectively.

In this case, if, among the $\Delta B1a$ (p1), $\Delta B1a$ (p2), ..., $\Delta B1a$ (pm), the $\Delta B1a$ (p1) is the smallest value, $\Delta B1a$ (p1) is set as the bandwidth increase/decrease of the ports p1 through pm through which the flow f1 passes.

If the above-described final bandwidth increase/decrease determination approach is generalized, the final bandwidth increase/decrease amounts at the port p1 through pm through which flows f1 through fn flow may be represented by min ($\Delta B1a$ (p1), $\Delta B1a$ (p2), ..., $\Delta B1a$ (pm), min ($\Delta B2a$ (p1), $\Delta B2a$ (p2), ..., $\Delta B2a$ (pm), ... min ($\Delta Bna$ (p1), $\Delta Bna$ (p2), ..., $\Delta Bna$ (pm).

Transmission of Bandwidth Increase/Decrease to Adjacent Apparatus

The bandwidth increase/decrease determined in the above-described manner is set as a new requested bandwidth increase/decrease (variance) amount, and information concerning a new bandwidth is inserted into a control frame. The control frame is then multicast to an adjacent apparatus within a VLAN.

In this example, in the switch sw2, a requested bandwidth increase/decrease amount is received at the port B from the switch sw5, and thus, upon receiving the bandwidth increase/decrease request through the port B, the bandwidths used at the ports C and D are examined as described above.

In this manner, autonomous bandwidth adjustment is performed at each port of a switch, and the smallest bandwidth increase/decrease amount for each flow is set as the adjusted bandwidth increase/decrease. Then, the adjusted bandwidth increase/decrease is transmitted and loaded to the subsequent switch. Since a control frame is not processed at a server or a router at the distal end of a flow, it is discarded.

An example of the configuration of a communication apparatus will be described below with reference to FIG. 4. A communication apparatus 10, which is applicable to, for example, an L2 switch, includes a traffic meter 11, a traffic prediction unit 12, a frame receiver 13, a control frame analyzer 14, an autonomous bandwidth controller 15, a bandwidth setting unit 16, a control frame generator 17, and a frame transmitter 18. The traffic prediction unit 12, the control frame analyzer 14, the autonomous bandwidth controller 15, the bandwidth setting unit 16, and the control frame generator 17 are programs. The autonomous bandwidth controller 15 includes a requested bandwidth increase/decrease determination section 15a, a bandwidth adjustment section 15b, and a smallest value detector 15c as programs. The above-described program set is executed by one or more processors (CPUs) 2a.

The communication apparatus 10 includes, as databases, a requested bandwidth increase/decrease (variance) database DB1, a port-unit bandwidth increase/decrease (variance) database DB2, an apparatus set value database DB3, and a billing information database DB4.

The traffic meter 11 measures a traffic rate and sends data indicating the measured traffic rate to the traffic prediction unit 12. The traffic prediction unit 12 performs time series analysis represented by an Auto-Regressive Integrated Moving Average (ARIMA) model.

If the traffic prediction unit 12 predicts that the traffic rate will exceed a currently set bandwidth, it sets a bandwidth corresponding to the traffic rate as a requested bandwidth increase/decrease amount, and sends the requested bandwidth increase/decrease amount to the autonomous bandwidth controller 15. The traffic prediction unit 12 also stores the requested bandwidth increase/decrease amount in the requested bandwidth increase/decrease database DB1.

Upon receiving a frame from an adjacent apparatus, the frame receiver 13 extracts a control frame including a requested bandwidth increase/decrease amount, and sends the extracted control frame to the control frame analyzer 14. The control frame analyzer 14 extracts a VLAN-ID and information concerning the requested bandwidth increase/decrease amount from the control frame, and stores the requested bandwidth increase/decrease amount in the requested bandwidth increase/decrease database DB1.

The requested bandwidth increase/decrease determination section 15a calculates the decision index D in the above-described equation (1), and determines whether D≥0. If D≥0, the requested bandwidth increase/decrease determination section 15a stores the requested bandwidth increase/decrease amount in the port-unit bandwidth increase/decrease database DB2. If D<0, the requested bandwidth increase/decrease determination section 15a instructs the bandwidth adjustment section 15b to calculate the adjusted bandwidth increase/decrease ΔBka.

In response to an instruction from the requested bandwidth increase/decrease determination section 15a, the bandwidth adjustment section 15b calculates the adjusted bandwidth increase/decrease ΔBka by using the above-described equation (2), and stores the calculation result in the port-unit bandwidth increase/decrease database DB2.

The smallest value detector 15c obtains the adjusted bandwidth increase/decrease ΔBka for each port from the port-unit bandwidth increase/decrease database DB2, and detects the smallest value for each flow (for each VLAN) and stores the detected smallest value in the apparatus set value database DB3. The smallest value detector 15c also instructs the bandwidth setting unit 16 to set the bandwidth.

In response to an instruction to set the bandwidth from the autonomous bandwidth controller 15, the bandwidth setting unit 16 obtains the bandwidth set value (ΔB) from the apparatus set value database DB3, and performs bandwidth setting for the communication apparatus 10 to reflect the bandwidth set value (ΔB) in the communication apparatus 10. The bandwidth setting unit 16 also stores the bandwidth increase/decrease, together with a time stamp, in the billing information database DB4.

In response to an instruction from the bandwidth setting unit 16, the control frame generator 17 generates a control frame in which the VLAN-ID and the bandwidth set value (bandwidth increase/decrease amount) are stored, and sends the generated control frame to the frame transmitter 18. The frame transmitter 18 transmits the control frame to an adjacent apparatus, as in transmitting general traffic frames.

Figure 5:
FIG. 5 illustrates an example of the storage state of a requested bandwidth variance database.

The databases DB1 through DB4 will now be discussed below. FIG. 5 illustrates an example of the storage state of the requested bandwidth increase/decrease database DB1. The requested bandwidth increase/decrease database DB1 includes attributes, such as the port, the VLAN-ID, and the requested bandwidth increase/decrease amount ΔBk, and registers therein information for each attribute. For example, the requested bandwidth increase/decrease amount ΔB for the port B through which the flow represented by VLAN1 passes is 41.66667 M.

FIG. 6 illustrates an example of the storage state of the port-unit bandwidth increase/decrease database DB2. The port-unit bandwidth increase/decrease database DB2 includes attributes, such as the port, the VLAN-ID, the initial bandwidth, and the bandwidth increase/decrease, and registers therein information for each attribute. The initial bandwidth is a bandwidth value before the requested bandwidth increase/decrease amount is reflected in the bandwidth value, and the bandwidth increase/decrease corresponds to the adjusted bandwidth increase/decrease ΔBka.

For example, the initial bandwidth for the port B through which the flow represented by VLAN1 passes is 100 M, and the adjusted bandwidth increase/decrease ΔBka is 41.66667 M.

FIG. 7 illustrates an example of the storage state of the apparatus set value database DB3. The apparatus set value database DB3 includes attributes, such as the VLAN-ID, the initial bandwidth, and the bandwidth increase/decrease, and registers therein information for each attribute.

FIG. 7 illustrates the registration state before the bandwidth is increased or decreased. The initial bandwidth (bandwidth set value) for the flow represented by VLAN1 is 100 M, and the bandwidth increase/decrease is 0. The initial bandwidth (bandwidth set value) for the flow represented by VLAN2 is 200 M, and the bandwidth increase/decrease is 0. The initial bandwidth (bandwidth set value) for the flow represented by VLAN3 is 400 M, and the bandwidth increase/decrease is 0. Information indicating that the burst traffic is 50 M and that the surplus bandwidth is 250 M is registered in the attribute of the initial bandwidth.

Figure 8:
FIG. 8 illustrates an example of the storage state of a billing information database.

FIG. 8 illustrates an example of the storage state of the billing information database DB4. The billing information database DB4 includes attributes, such as the VLAN-ID and time stamps (time slots in which a bandwidth is used) T1 through Tn, and registers therein information for each attribute.

For example, for the flow represented by VLAN1, the bandwidth corresponding to 100 M is used in the time slot T1, and the bandwidth corresponding to 141 M is used in the time slot T2. In this manner, by managing information indicating which bandwidth is used in a certain time slot, such information may be reflected in billing.

A description will now be given of examples of the format configuration of a control frame with reference to FIGS. 9 through 11. The control frames F1 through F3, which are in compliance with the Ethernet (registered trademark) frame format, may be transferred by using L2 switches.

The control frame F1 illustrated in FIG. 9 includes fields for a preamble/start frame delimiter (SFD) (8 bytes), a destination address (6 bytes), a sender address (6 bytes), TYPE (2 bytes), a VLAN tag (2 bytes), a bandwidth set value (6 bytes), data (38 through 1492 bytes), and a frame check sequence (FCS) (4 bytes). The data includes padding.

In flows in VLAN units, a VLAN tag (VLAN-ID) is stored in the VLAN tag field so that the flow is identified. In the bandwidth set value field, the bandwidth increase/decrease amount is stored.

The control frame F2 illustrated in FIG. 10 includes fields for a preamble/SFD (8 bytes), a destination address (6 bytes), a sender address (6 bytes), TYPE (2 bytes), TIME (4 bytes), DURATION (3 bytes), a VLAN tag (2 bytes), a bandwidth set value (6 bytes), data (31 through 1485 bytes), and an FCS (4 bytes). The data includes padding.

The control frame F2 is an extended frame format that allows a user to specify the time when a bandwidth increase/decrease is set. The control frame F2 has the TIME field and the DURATION field as new fields. The TIME field is a field in which the start time when setting of a bandwidth increase/decrease is started. The DURATION field is a field in which a duration time for which setting of bandwidth increase/decrease continues is stored.

The control frame F3 illustrated in FIG. 11 includes fields for a preamble/SFD (8 bytes), a destination address (6 bytes), a sender address (6 bytes), TYPE (2 bytes), a VLAN tag (2 bytes), an algorithm (1 byte), data (43 through 1497 bytes), and an FCS (4 bytes). The data includes padding.

The control frame F3 has an algorithm field. The algorithm field serves to specify, for a scheduler (described later), which algorithm is used for performing scheduling for reading data stored in a queue circuit.

FIG. 12 illustrates an example of setting of the algorithm field. For example, when the initial operation is performed, the field value (decimal) is set to be 1, and the round robin (RR) algorithm is specified in the scheduler.

When autonomous bandwidth control is performed, the field value (decimal) is set to be 2, and the deficit round robin (DRR) algorithm is specified in the scheduler. Upon the occurrence of a failure or an emergency, the field value (decimal) is set to be 4, and the strict priority (SP) algorithm in which data having a higher priority in a queue circuit is transmitted with a higher priority, is set in the scheduler.

In this manner, when autonomous bandwidth control is performed (during the normal operation), information for specifying the DRR algorithm is stored in the control frame F3, and the control frame F3 is transmitted to an adjacent apparatus. Upon detecting an abnormality, such as the occurrence of link down, in an adjacent apparatus, in order to protect traffic of a system having a higher priority, such as a management system, from such an abnormality, information for specifying the SP algorithm is stored in the control frame F3, and the control frame F3 is transmitted to the adjacent apparatus.

Figure 13:
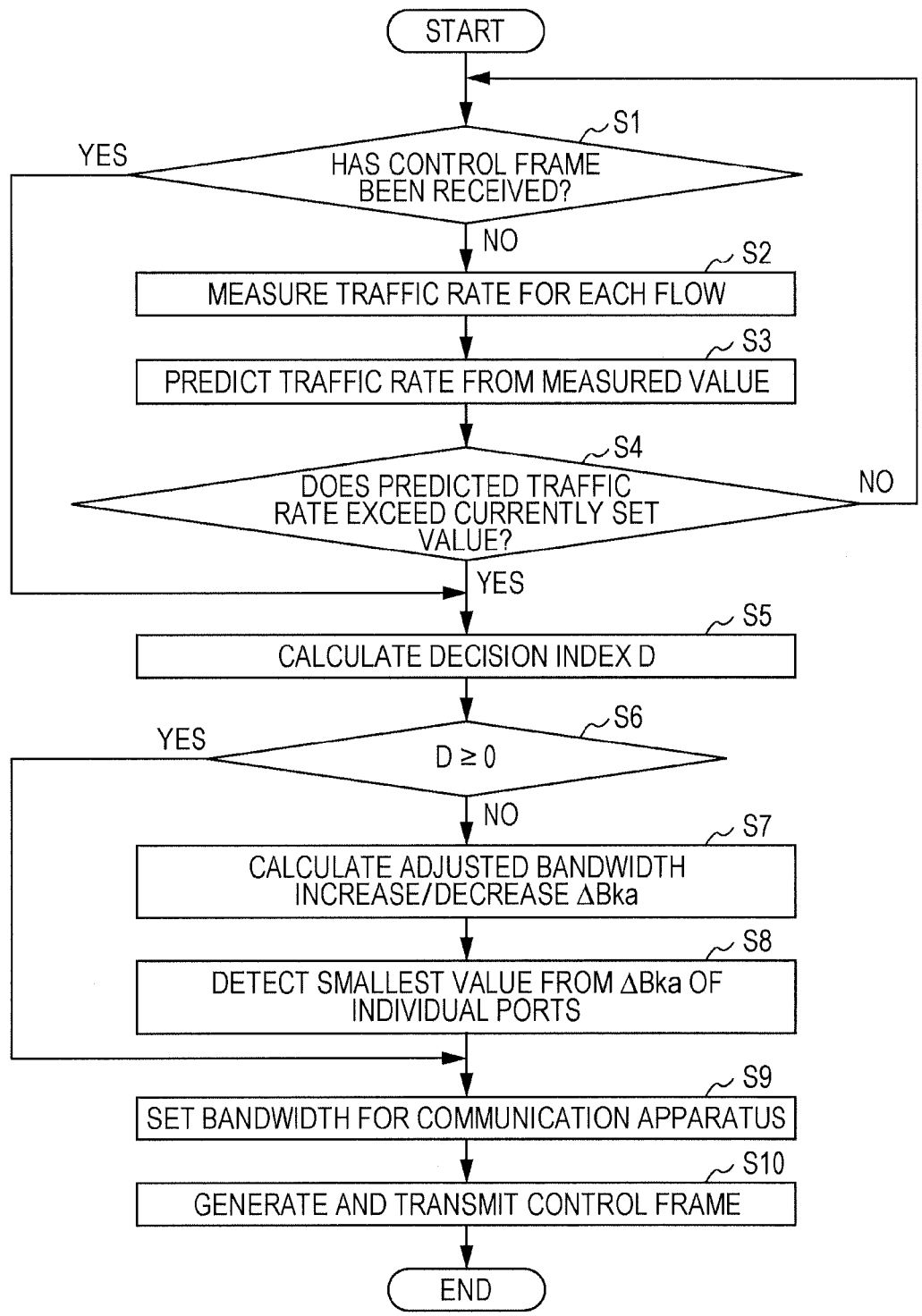
FIG. 13 is a flowchart illustrating autonomous bandwidth control processing.

An operation for performing autonomous bandwidth control will be described with reference to the flowchart of FIG. 13.

In operation S1, the frame receiver 13 determines whether a control frame in which a bandwidth set value is stored has been received. If a control frame has been received, the process proceeds to operation S5. If a control frame has not been received, the process proceeds to operation S2.

In operation S2, the traffic meter 11 measures a traffic rate for each flow.

In operation S3, the traffic prediction unit 12 predicts a traffic rate from the measured rate.

In operation S4, the traffic prediction unit 12 determines whether the traffic rate will exceed a currently set bandwidth. If the result of operation S4 is YES, the process proceeds to operation S5. If the result of operation S4 is NO, the process returns to operation S1.

In operation S5, the requested bandwidth increase/decrease determination section 15a calculates the decision index D in accordance with equation (1). In this case, if a control frame in which a bandwidth set value is stored has been received, the requested bandwidth increase/decrease determination section 15a considers the bandwidth set value as a requested bandwidth increase/decrease amount, and calculates the decision index D on the basis of the requested bandwidth increase/decrease amount and the surplus bandwidth.

If the traffic rate exceeds the currently set bandwidth, the requested bandwidth increase/decrease determination section 15a considers the traffic rate as the requested bandwidth increase/decrease amount, and calculates the decision index D on the basis of the requested bandwidth increase/decrease amount and the surplus bandwidth.

In operation S6, the requested bandwidth increase/decrease determination section 15a determines whether the decision index D is equal to or greater than 0. If the decision index D is equal to or greater than 0, the process proceeds to operation S9. If the decision index D is smaller than 0, the process proceeds to operation S7.

In operation S7, the bandwidth adjustment section 15b calculates the adjusted bandwidth increase/decrease $\Delta Bka$ in accordance with equation (2).

In operation S8, the smallest value detector 15c detects the smallest value from among the adjusted bandwidth increase/decrease amounts $\Delta Bka$ of the individual ports.

In operation S9, the bandwidth setting unit 16 sets the bandwidth for the communication apparatus 10.

In operation S10, the control frame generator 17 generates a control frame in which the flow identifier (e.g., VLAN-ID) and the bandwidth set value are stored, and the frame transmitter 18 transmits the control frame to an adjacent apparatus.

As described above, by performing autonomous bandwidth control among control apparatuses (switches), a load for bandwidth setting, which has been performed for communication apparatuses by an operation management system, may be reduced. It is thus possible to allocate the resources of the operation management system to another processing.

Additionally, a reduced load in the operation management system makes it possible to add VMs to the same physical server set with the operation management system. It is also possible to reduce communication concerning bandwidth setting between the operation management system and communication apparatuses, which decreases delay time caused by bandwidth setting, thereby implementing the speedy optimization of bandwidth setting for the entire network.

A communication apparatus performs autonomous bandwidth control on the basis of the following two determinations. In one determination, if a control frame has been received from an adjacent apparatus, the communication apparatus regards a bandwidth set value included in the received control frame as a requested bandwidth increase/decrease amount for the communication apparatus. In another determination, if a traffic rate measured in the communication apparatus exceeds a currently set bandwidth, the communication apparatus regards the traffic rate as the requested bandwidth increase/decrease amount. With this configuration, the precision in performing bandwidth control is improved, thereby enhancing the reliability of the bandwidth control.

Figure 14:
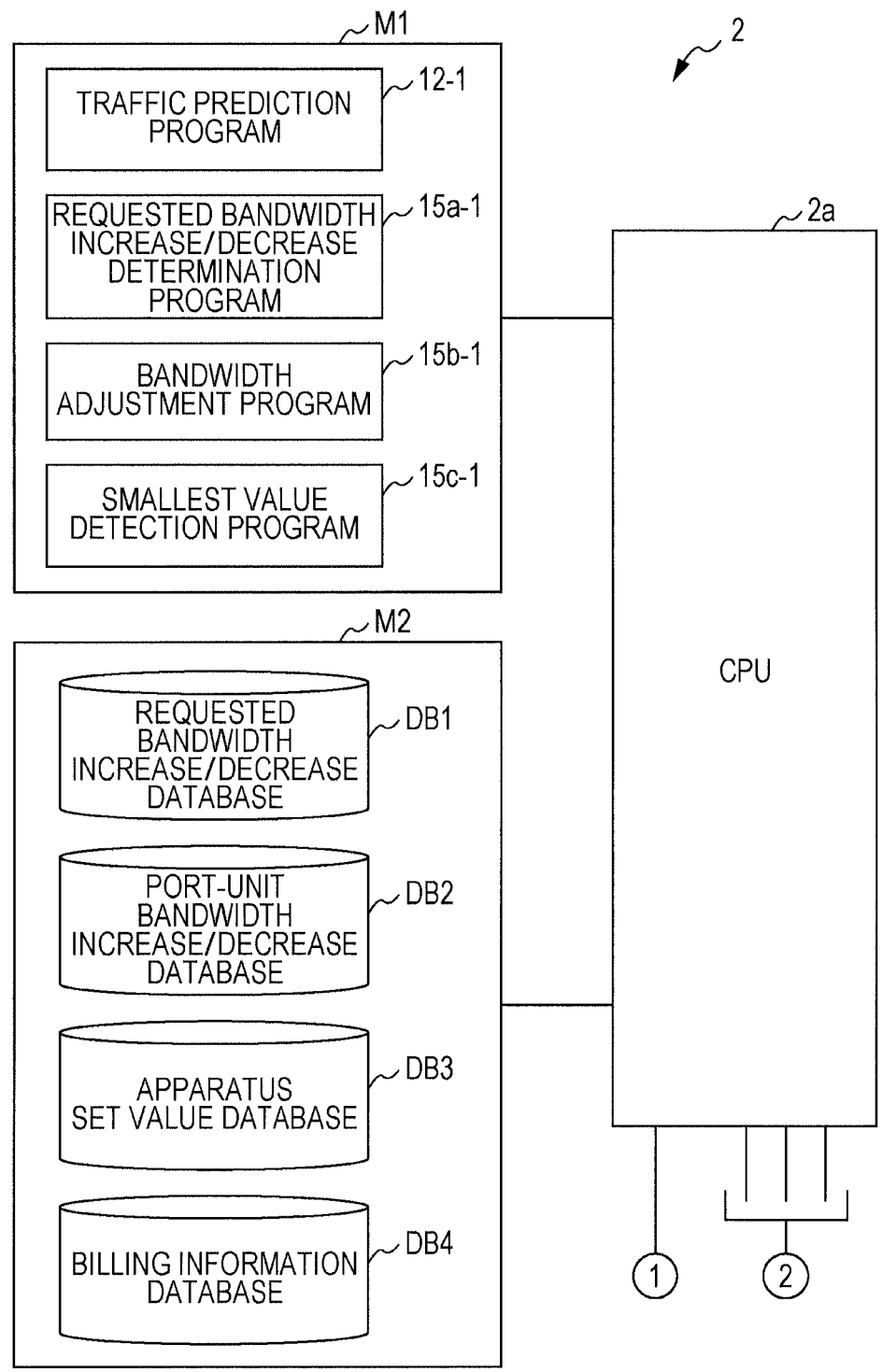
FIG. 14 illustrates another example of the configuration of a communication apparatus.
Figure 15:
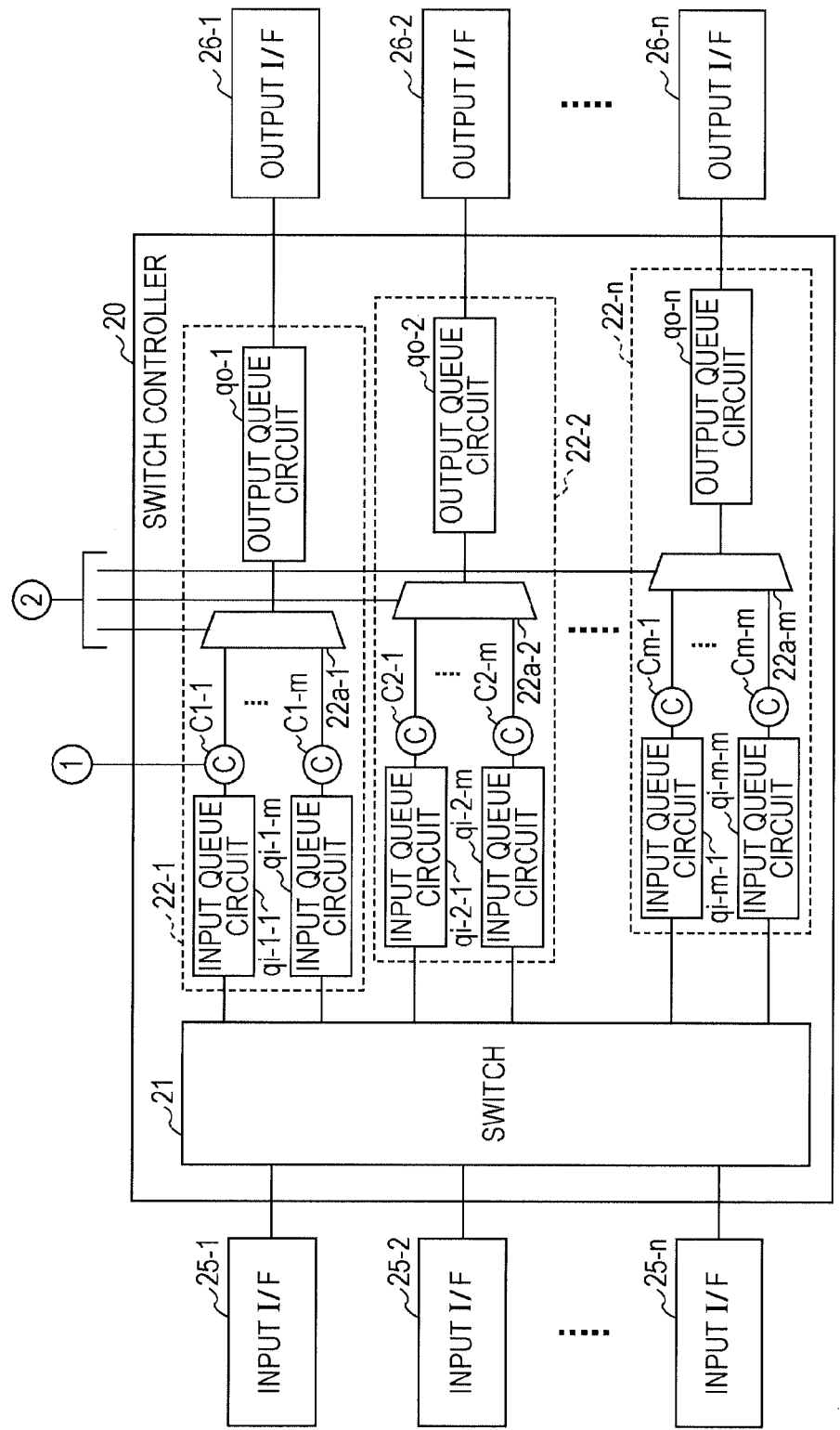
FIG. 15 illustrates another example of the configuration of a communication apparatus.

The configuration of a communication apparatus including a switching function will be described below with reference to FIGS. 14 and 15. FIGS. 14 and 15 illustrate an example of the configuration of a communication apparatus 2. The communication apparatus 2 includes a central processing unit (CPU) 2a, a switch controller 20, input interfaces (I/Fs) 25-1 through 25-n, output I/Fs 26-1 through 26-n, and memories M1 and M2.

The memory M1 includes a traffic prediction program 12-1, a requested bandwidth increase/decrease determination program 15a-1, a bandwidth adjustment program 15b-1, and a smallest value detection program 15c-1.

Figure 4:
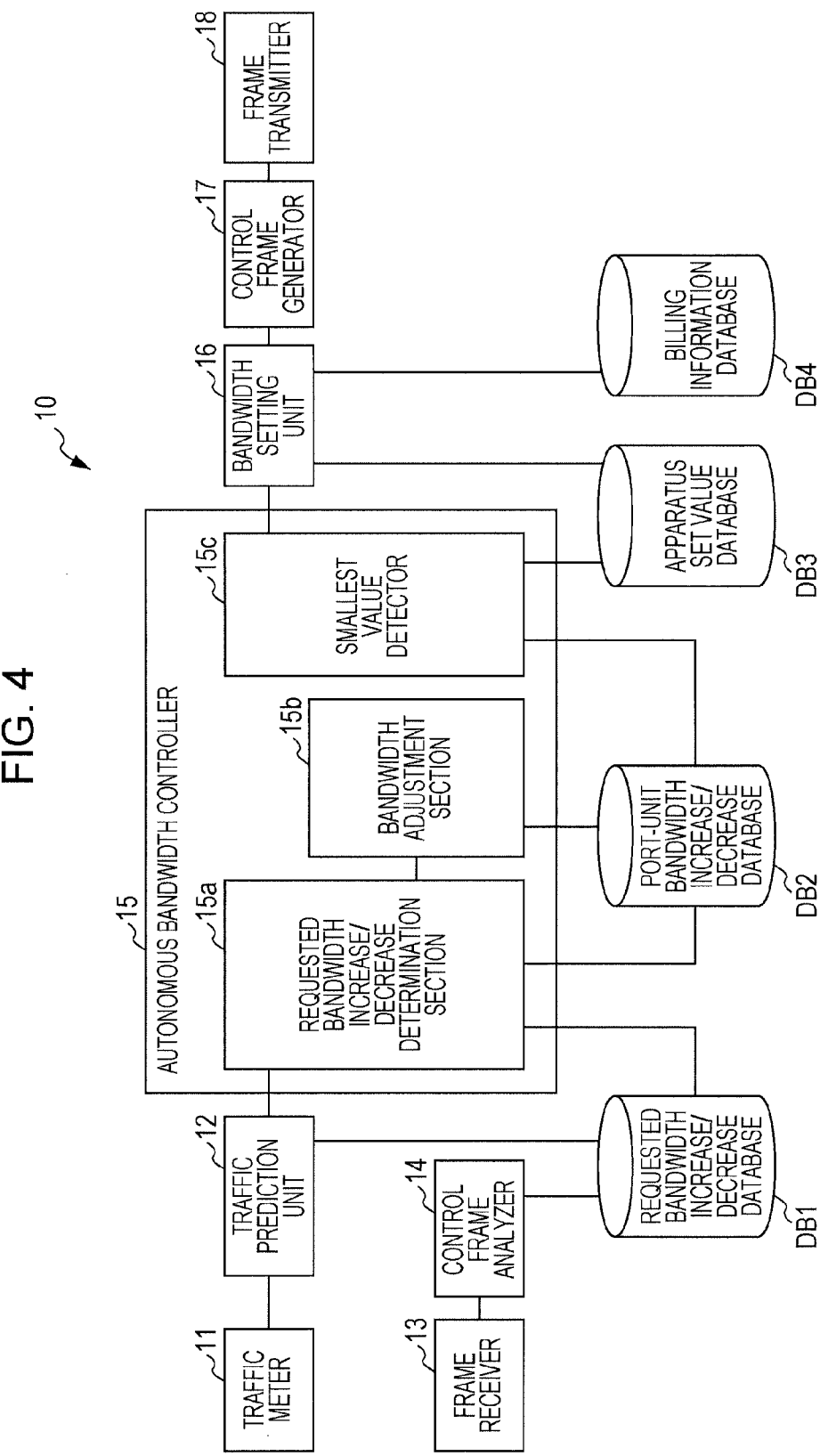
FIG. 4 illustrates an example of the configuration of a communication apparatus.

The traffic prediction program 12-1 is a traffic prediction processing program in the traffic prediction unit 12 illustrated in FIG. 4. The requested bandwidth increase/decrease determination program 15a-1 is a requested bandwidth increase/decrease determination processing program (program for computing equation (1)) in the requested bandwidth increase/decrease determination section 15a.

The bandwidth adjustment program 15b-1 is a bandwidth adjustment processing program (program for computing equation (2)) in the bandwidth adjustment section 15b illustrated in FIG. 4. The smallest value detection program 15c-1 is a smallest value detection processing program in the smallest value detector 15c illustrated in FIG. 4. Those programs are called by the CPU 2a and are executed. The functions of the control frame analyzer 14, the bandwidth setting unit 16, and the control frame generator 17 are also executed by the CPU 2a.

The memory M2 includes the requested bandwidth increase/decrease database DB1, the port-unit bandwidth increase/decrease database DB2, the apparatus set value database DB3, and the billing information database DB4 illustrated in FIG. 4.

The input I/Fs 25-1 through 25-n include the frame receiver 13 illustrated in FIG. 4, and the output I/Fs 26-1 through 26-n include the frame transmitter 18 illustrated in FIG. 4.

The switch controller 20 includes a switch 21 and scheduling processors 22-1 through 22-n. The scheduling processor 22-1 includes input queue circuits qi-1-1 through qi-1-m, counters C1-1 through C1-m, and a scheduler 22a-1, and an output queue circuit qo-1.

The scheduling processor 22-2 includes input queue circuits qi-2-1 through qi-2-m, counters C2-1 through C2-m, and a scheduler 22a-2, and an output queue circuit qo-2. The scheduling processor 22-n includes input queue circuits qi-m-1 through qi-m-m, counters Cm-1 through Cm-m, and a scheduler 22a-m, and an output queue circuit qo-n.

In the switch controller 20, the switch 21 outputs destination-solved frames from output ports and distributes them among the input queue circuits qi-1-1 through qi-m-m on the basis of the VLAN-IDs and stores them therein.

Subsequent to the input queue circuits qi-1-1 through qi-m-m, the counters C1-1 through Cm-m, which serve as the traffic meter 11, are disposed, and transmit the counted traffic rates to the CPU 2a. The CPU 2a reads the traffic prediction program 12-1 and predicts the traffic rate on the basis of the received traffic rates. In response to scheduling instructions from the CPU 2a, the schedulers 22a-1 through 22a-m read the frames from the input queue circuits qi-1-1 through qi-m-m.

In this manner, in the switch controller 20, frames are distributed among the plurality of input queue circuits qi-1-1 through qi-m-m and are stored therein, and then, the stored frames are read from the input queue circuits qi-1-1 through qi-m-m on the basis of the scheduling instructed by the CPU 2a. It is thus possible to inhibit only a single flow from consuming a large bandwidth in a physical line, thereby securing a bandwidth and improving the communication quality.

Figure 16:
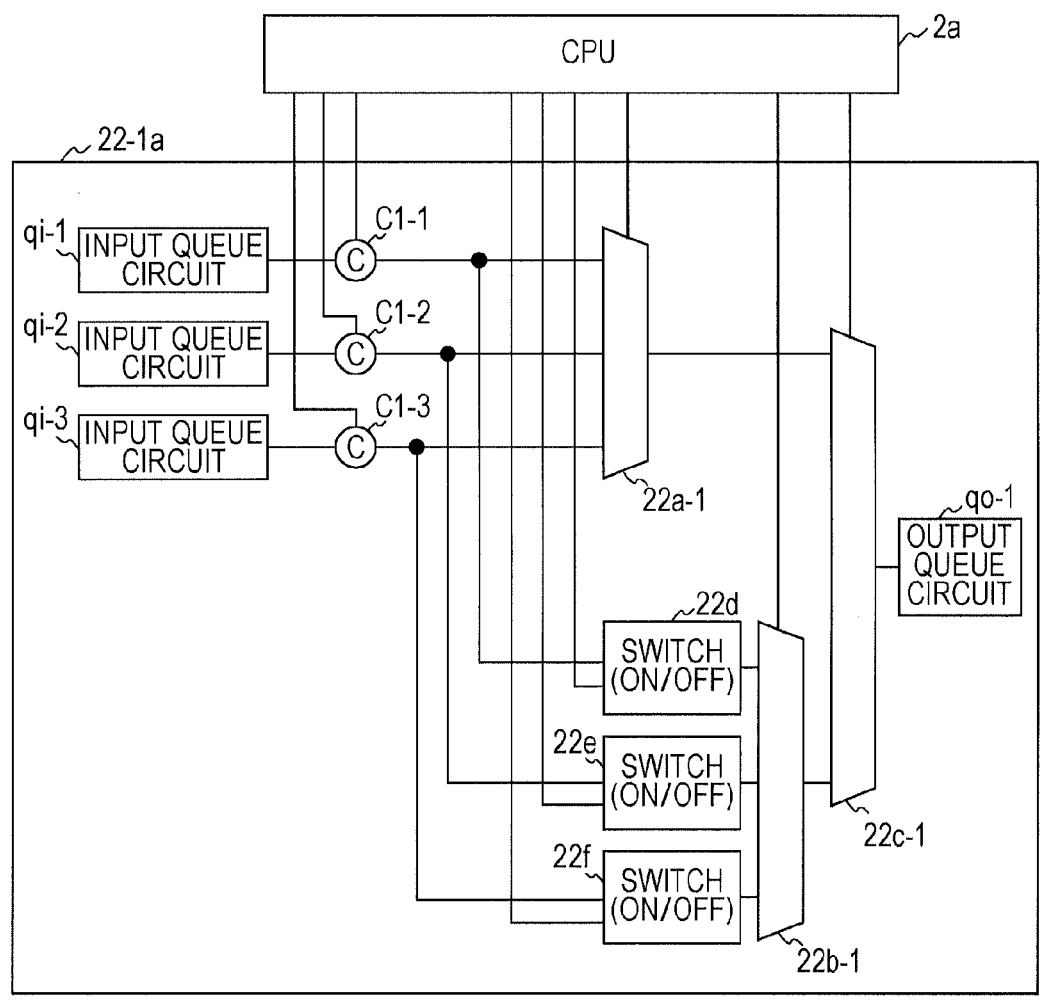
FIG. 16 illustrates an example of the configuration of a scheduling processor.

Bandwidth control of burst traffic will now be discussed below. FIG. 16 illustrates an example of the configuration of a scheduling processor 22-1a that performs scheduling processing to deal with burst traffic.

The scheduling processor 22-1a includes input queue circuits qi-1 through qi-3, counters C1-1 through C1-3, switches 22d, 22e, and 22f, schedulers 22a-1, 22b-1, and 22c-1, and an output queue circuit qo-1.

The input queue circuits qi-1 through qi-3 each include a memory, e.g., a random access memory (RAM), and queue therein frames output from the switch 21 illustrated in FIG. 15. The scheduler 22a-1 reads the frames from the input queue circuits qi-1 through qi-3 on the basis of scheduling instructions (e.g., an instruction about the proportion of frames read from the input queue circuits qi-1 through qi-3, and an instruction about which algorithm is to be used) instructed by the CPU 2a.

The counters C1-1 through C1-3 count frames output from the input queue circuits qi-1 through qi-3, respectively, and transmit the counted numbers to the CPU 2a as measured traffic values.

The switches 22d, 22e, and 22f respectively switch between ON/OFF on the basis of a switching instruction from the CPU 2a to determine whether the output of frames output from the input queue circuits qi-1 through qi-3 is to be switched from the scheduler 22a-1 to the scheduler 22b-1.

The scheduler 22b-1 is a scheduler specially used for a burst traffic bandwidth, and performs scheduling to deal with burst traffic on the basis of scheduling instructions from the CPU 2a.

The scheduler 22c-1 performs scheduling for frames output from the schedulers 22a-1 and 22b-1 on the basis of scheduling instructions from the CPU 2a. The output queue circuit qo-1 queues therein output frames from the scheduler 22c-1.

An operation performed upon the occurrence of burst traffic will be discussed below. The occurrence of burst traffic is identified by the CPU 2a, on the basis of the counter values counted in the counters C1-1 through C1-3, depending on whether or not each of the counter value exceeds a set bandwidth.

If the counter value exceeds the set bandwidth, the CPU 2a starts the scheduler 22b-1 to which a burst traffic bandwidth is allocated, and also turns ON the associated switch. For example, if the CPU 2a identifies the occurrence of burst traffic from the counter value of the counter C1-1, it turns ON the switch 22d to switch scheduling of frames output from the input queue circuits qi-1 from the scheduler 22a-1 to the scheduler 22b-1.

The scheduler 22b-1 reads and processes the frames output from the input queue circuit qi-1 by using the burst traffic bandwidth. Upon identifying from the counter value in the counter C1-1 that burst traffic has been reduced, the CPU 2a turns OFF the switch 22d. The CPU 2a then switches back scheduling of frames output from the input queue circuit qi-1 from the scheduler 22b-1 to the scheduler 22a-1.

Figure 17:
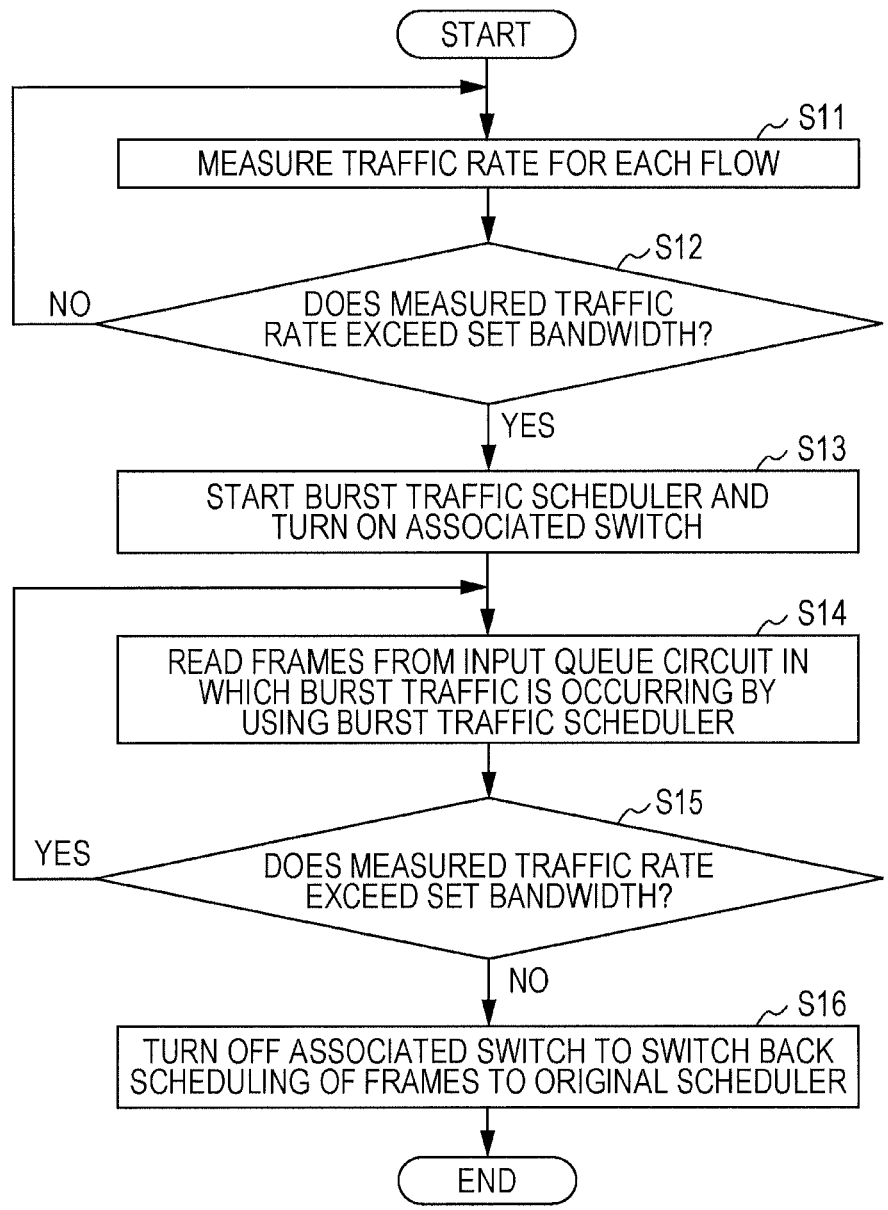
FIG. 17 is a flowchart illustrating burst traffic scheduling processing.

FIG. 17 is a flowchart illustrating scheduling processing for burst traffic.

In operation S11, the counters C1-1 through C1-3 measure traffic rates for individual flows and inform the CPU 2a of the measured traffic rates.

In operation S12, the CPU 2a determines whether each of the measured traffic rates exceeds a set bandwidth. If the measured traffic rate exceeds the set bandwidth, the process proceeds to operation S13. If the measured traffic rate does not exceed the set bandwidth, the process returns to operation S11.

In operation S13, the CPU 2a starts the burst traffic scheduler 22b-1 and turns ON the associated switch.

In operation S14, the scheduler 22b-1 reads frames from the input queue circuit in which burst traffic is occurring.

In operation S15, the CPU 2a determines whether the measured traffic rate exceeds the set bandwidth. If the result of operation S15 is YES, the process returns to operation S14. If the result of operation S15 is NO, the process proceeds to operation S16.

In operation S16, the CPU 2a turns OFF the associated switch to switch back the scheduling of output frames from the scheduler 22b-1 to the scheduler 22a-1.

As described above, scheduling for the burst traffic bandwidth is performed by using a scheduler dedicated to burst traffic. This makes it possible to flexibly allocate the burst traffic bandwidth to frames in an input queue circuit in which burst traffic is occurring and also to speedily read the frames from the input queue circuit, thereby suppressing the occurrence of frame dropping.

Figure 18:
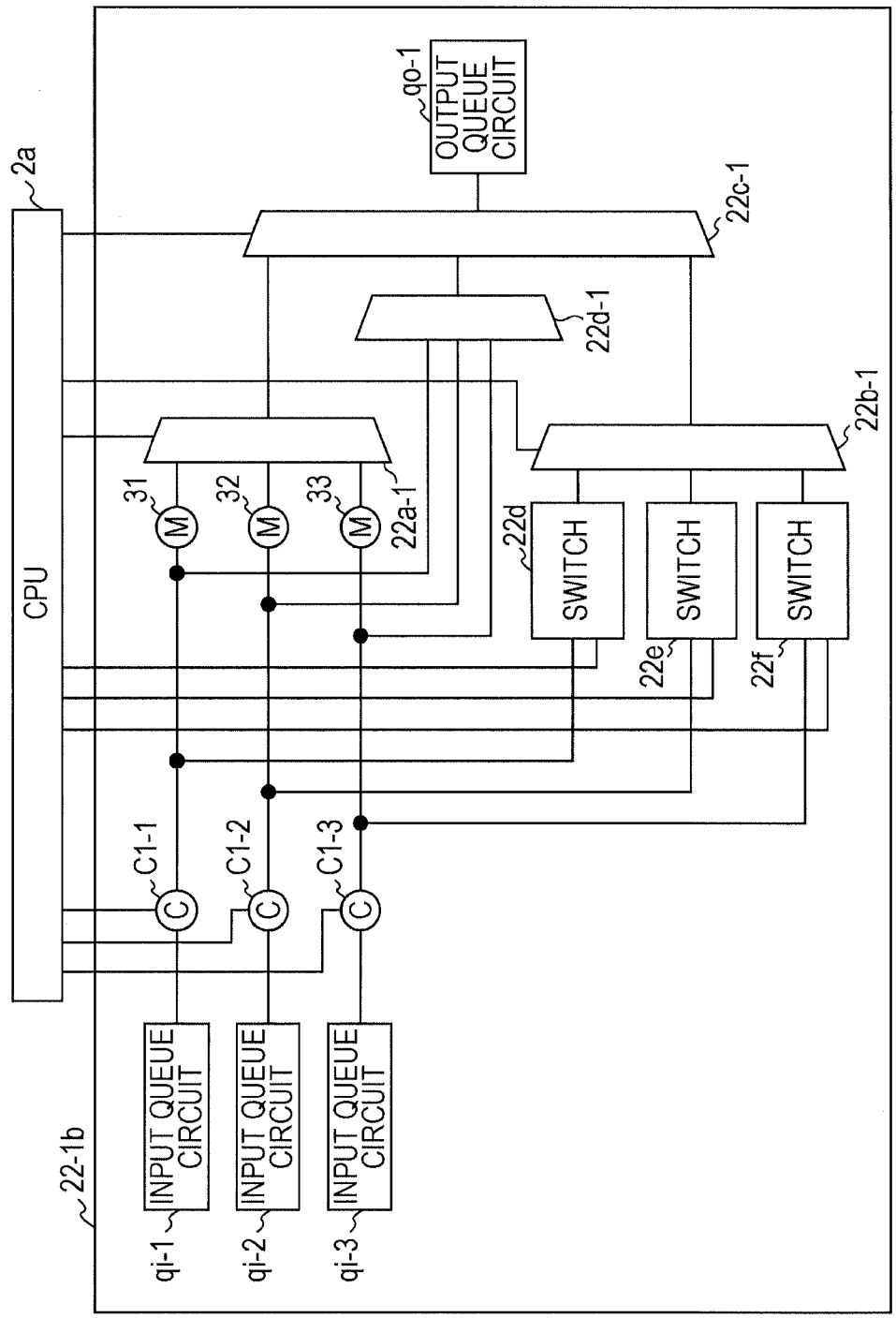
FIG. 18 illustrates another example of the configuration of a scheduling processor.

Scheduling processing for a surplus bandwidth will now be discussed below. FIG. 18 illustrates an example of the configuration of a scheduling processor 22-1b. The scheduling processor 22-1b includes input queue circuits qi-1 through qi-3, counters C1-1 through C1-3, switches 22d, 22e, and 22f, schedulers 22a-1, 22b-1, 22c-1, and 22d-1, upper-limit bandwidth setting units 31 through 33, and an output queue circuit qo-1.

In addition to the components of the scheduling processor 22-1a illustrated in FIG. 16, the upper-limit bandwidth setting units 31 through 33 and the scheduler 22d-1 are disposed. The scheduler 22a-1 illustrated in FIG. 16 processes the set bandwidth (lowest bandwidth) and the surplus bandwidth at the same time. However, in the scheduling processor 22-1b illustrated in FIG. 18, the scheduler 22a-1 is specially used for the set bandwidth and reads output frames up to the set bandwidth for each flow. At the input side of the scheduler 22a-1, the upper-limit bandwidth setting units 31 through 33 are disposed so that the scheduler 22a-1 may be inhibited from reading output frames exceeding the set bandwidth.

Meanwhile, the scheduler 22d-1 is a scheduler specially used for the surplus bandwidth and independently performs scheduling for reading data for the surplus bandwidth from the input queue circuits qi-1 through qi-3. That is, the surplus bandwidth scheduler 22d-1 performs control only for the surplus bandwidth.

Figure 19:
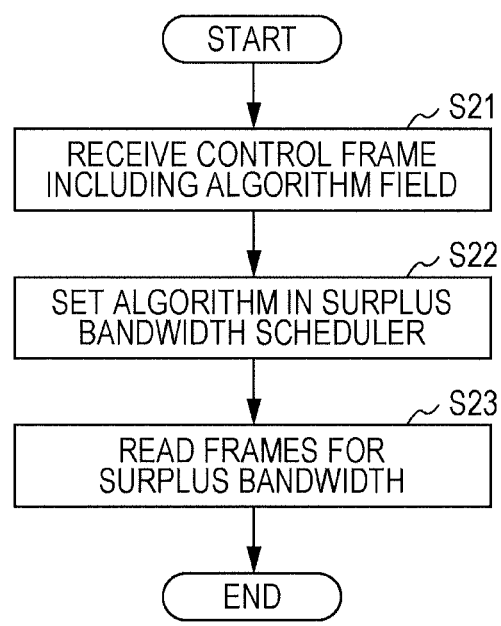
FIG. 19 is a flowchart illustrating surplus bandwidth scheduling processing.

FIG. 19 is a flowchart illustrating scheduling processing for a surplus bandwidth.

In operation S21, the input I/Fs 25-1 through 25-n receive a control frame including an algorithm field.

In operation S22, the CPU 2a sets an algorithm described in the control frame in the surplus bandwidth scheduler 22d-1.

In operation S23, the surplus bandwidth scheduler 22d-1 reads frames for the surplus bandwidth from the input queue circuits qi-1 through qi-3 on the basis of the specified algorithm.

As described above, by providing a scheduler specially used for a surplus bandwidth, the surplus bandwidth scheduler performs scheduling for the surplus bandwidth independently of the scheduler that performs scheduling for a set bandwidth. By using a scheduler that performs scheduling both for a set bandwidth and a surplus bandwidth, if the output proportion of a certain flow is changed, the proportion of the set bandwidths is also changed. This may also influence the output proportion of another flow, for example, the set bandwidth of another flow may become lower than the original set bandwidth.

In contrast, by providing a scheduler for independently performing scheduling for the surplus bandwidth, even if the output proportion of a certain flow is changed, such a change may be absorbed by changing the proportion of the surplus bandwidth. Accordingly, the original set bandwidth may be secured, thereby implementing stable bandwidth control. Additionally, since the management of a surplus bandwidth allocated to each flow is facilitated, the use of bandwidths is easily reflected in billing information.

The embodiments have been discussed by way of examples only. The components discussed in the embodiments may be replaced by other components having equivalent functions. Additionally, other components and operations may be added as desired.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication system, comprising:
   a first communication apparatus including
      one or more first processors that determine a first bandwidth variance for each flow, based on a requested bandwidth variance amount and a surplus bandwidth of a physical line, and
      a first transmitter that transmits the first bandwidth variance to an adjacent apparatus; and
   a second communication apparatus including
      one or more second processors that set the received first bandwidth variance as a requested bandwidth variance amount for the second communication apparatus and determine a second bandwidth variance for each flow from the first bandwidth variance and the surplus bandwidth, and
      a second transmitter that transmits the second bandwidth variance to an adjacent apparatus.

2. The communication system according to claim 1, wherein
   the one or more first processors and the one or more second processors each subtract a total of the requested bandwidth variance amounts for individual flows from the surplus bandwidth so as to calculate a decision index indicating whether to perform bandwidth adjustment; and
   when the one or more first processors or the one or more second processors determine based on the decision index that the bandwidth adjustment is to be performed, the one or more first processors or the one or more second processors multiply the decision index by the ratio of a target requested bandwidth variance amount, which is a requested bandwidth variance amount of a flow for which the bandwidth adjustment is to be performed, to the total of the requested bandwidth variance amounts for the individual flows, and add the target requested bandwidth variance amount to a value obtained as a result of multiplication, so that the one or more first processors determine the first bandwidth variance and the one or more second processors determine the second bandwidth variance.

3. The communication system according to claim 1, wherein
the first communication apparatus and the second communication apparatus each further include a traffic meter that measures a traffic rate of received data, and
the one or more first processors and the one or more second processors each predict on the basis of the measured traffic rate whether the traffic rate exceeds a currently set bandwidth, and if the one or more first processors and the one or more second processors each predict that the traffic rate exceeds the currently set bandwidth, the one or more first processors and the one or more second processors set a bandwidth corresponding to the traffic rate as the requested bandwidth variance amount, and determine the first bandwidth variance and the second bandwidth variance, respectively, for each flow from the requested bandwidth variance amount and the surplus bandwidth.

4. The communication system according to claim 1, wherein
the first communication apparatus and the second communication apparatus each further includes a plurality of queue circuits, a first scheduler, and a second scheduler,
when burst traffic does not occur, the first scheduler reads data from the plurality of queue circuits by using a given bandwidth, and
when burst traffic occurs in one of the plurality of queue circuits, the second scheduler reads data from the queue circuit in which the burst traffic occurs by using a bandwidth for the burst traffic.

5. The communication system according to claim 1, wherein the first communication apparatus and the second communication apparatus each further includes a surplus bandwidth scheduler that independently performs scheduling for reading data for the surplus bandwidth.

6. A communication apparatus, comprising:
one or more processors that receive bandwidth variance information indicating a bandwidth variance determined in another apparatus, set the bandwidth variance as a requested bandwidth variance amount for the communication apparatus, and determine a bandwidth variance of the communication apparatus for each flow from the requested bandwidth variance amount and a surplus bandwidth of a physical line; and
a transmitter that transmits the bandwidth variance to an adjacent apparatus as bandwidth variance information indicating the bandwidth variance of the communication apparatus.

7. The communication apparatus according to claim 6, wherein:
the one or more processors subtract a total of the requested bandwidth variance amounts for individual flows from the surplus bandwidth so as to calculate a decision index indicating whether to perform bandwidth adjustment; and
when the one or more processors determine on the basis of the decision index that the bandwidth adjustment is to be performed, the one or more processors multiply the decision index by the ratio of a target requested bandwidth variance amount, which is a requested bandwidth variance amount of a flow for which the bandwidth adjustment is to be performed, to the total of the requested bandwidth variance amounts for the individual flows, and add the target requested bandwidth variance amount to a value obtained as a result of multiplication, thereby determining the bandwidth variance.

8. The communication apparatus according to claim 6, further comprising:
a traffic meter that measures a traffic rate of received data, wherein the one or more processors predict on the basis of the measured traffic rate whether the traffic rate exceeds a currently set bandwidth, and when the one or more processors predict that the traffic rate exceeds the currently set bandwidth, the one or more processors set a bandwidth corresponding to the traffic rate as the requested bandwidth variance amount, and determine the bandwidth variance for each flow from the requested bandwidth variance amount and the surplus bandwidth.

9. The communication apparatus according to claim 6, further comprising:
a plurality of queue circuits, a first scheduler, and a second scheduler,
wherein when burst traffic does not occur, the first scheduler reads data from the plurality of queue circuits by using a given bandwidth; and
when burst traffic occurs in one of the plurality of queue circuits, the second scheduler reads data from the queue circuit in which the burst traffic occurs by using a bandwidth for the burst traffic.

10. The communication apparatus according to claim 6, further comprising:
a surplus bandwidth scheduler that independently performs scheduling for reading data for the surplus bandwidth.

* * * * *